United States Patent
Andersson et al.

(10) Patent No.: US 9,475,122 B2
(45) Date of Patent: Oct. 25, 2016

(54) TOOL FOR CHIP REMOVING MACHINING AS WELL AS AN INSERT-HOLDING BLADE AND A REPLACEABLE CUTTING INSERT THEREFOR

(71) Applicant: SANDVIK INTELLECTUAL PROPERTY AB, Sandviken (SE)

(72) Inventors: Claes Andersson, Valbo (SE); Gunnar Jansson, Sandviken (SE); Jimmy Pihl, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 267 days.

(21) Appl. No.: 14/315,724

(22) Filed: Jun. 26, 2014

(65) Prior Publication Data

US 2015/0003921 A1    Jan. 1, 2015

(30) Foreign Application Priority Data

Jun. 28, 2013 (EP) ........................ 1350795

(51) Int. Cl.
| | |
|---|---|
| B23B 27/10 | (2006.01) |
| B23B 27/04 | (2006.01) |
| B23B 27/08 | (2006.01) |
| B23B 29/04 | (2006.01) |
| B23C 5/00 | (2006.01) |

(52) U.S. Cl.
CPC ............ *B23B 27/10* (2013.01); *B23B 27/045* (2013.01); *B23B 27/08* (2013.01); *B23B 29/043* (2013.01); *B23B 2205/02* (2013.01); *B23B 2250/12* (2013.01); *B23B 2260/0785* (2013.01); *Y10T 407/14* (2015.01)

(58) Field of Classification Search
CPC ... B23B 27/04; B23B 27/045; B23B 27/043; B23B 27/06; B23B 27/10; B23Q 29/043
See application file for complete search history.

(56) References Cited

U.S. PATENT DOCUMENTS

| | | | | |
|---|---|---|---|---|
| 5,743,680 A | * | 4/1998 | Von Haas | ............... B23B 27/04 407/110 |
| 2008/0131215 A1 | * | 6/2008 | Sjoo | ........................ B23B 27/04 407/110 |
| 2008/0240875 A1 | * | 10/2008 | Nagaya | ................. B23B 27/045 407/113 |
| 2009/0285645 A1 | * | 11/2009 | Hecht | ..................... B23B 27/04 407/107 |
| 2013/0129428 A1 | * | 5/2013 | Henry | .................... B23B 27/04 407/11 |

(Continued)

FOREIGN PATENT DOCUMENTS

| | | |
|---|---|---|
| DE | 4433389 A1 | 3/1996 |
| JP | 404315503 | 11/1992 |
| JP | 7-227702 | 8/1995 |

*Primary Examiner* — Will Fridie, Jr.
(74) *Attorney, Agent, or Firm* — Corinne R. Gorski

(57) ABSTRACT

A parting tool for the chip removing machining of metal blanks includes a blade and a replaceable cutting insert mounted in a seat, which is delimited between a bottom support and an elastically resilient clamping finger. The cutting insert includes an upper side, in which there is included a front rake surface, as well as an application surface positioned behind the same and against which the clamping finger is pressed. In the clamping finger, a flushing channel is included to spray a cooling medium toward the rake surface. A front nose of the clamping finger facing a shoulder is formed between the rake surface and the application surface and has the purpose of protecting the nose from chips. The shoulder has two knobs mutually separated by a central notch, via which cooling medium can pass from the flushing channel toward the rake surface.

14 Claims, 7 Drawing Sheets

(56) References Cited

U.S. PATENT DOCUMENTS

| | | | | |
|---|---|---|---|---|
| 2013/0202372 A1* | 8/2013 | Hecht | ................... | B23B 27/10 407/107 |
| 2014/0133924 A1* | 5/2014 | Oren | ................... | B23B 29/043 407/11 |
| 2014/0321926 A1* | 10/2014 | Sadikov | ................. | B23B 27/10 407/11 |
| 2015/0343534 A1* | 12/2015 | Kaufmann | ............ | B23B 27/045 407/11 |

* cited by examiner

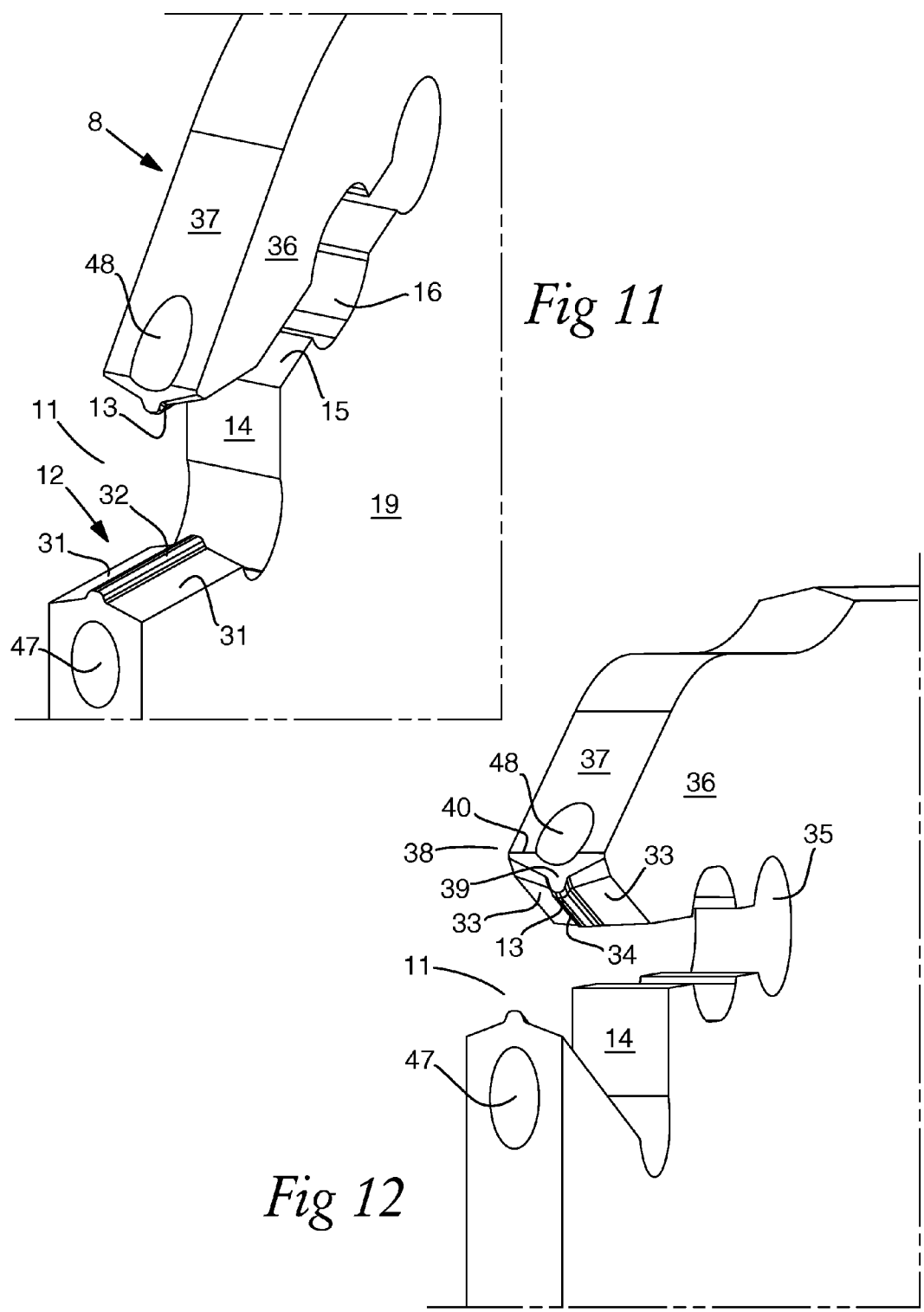

TOOL FOR CHIP REMOVING MACHINING AS WELL AS AN INSERT-HOLDING BLADE AND A REPLACEABLE CUTTING INSERT THEREFOR

RELATED APPLICATION DATA

This application claims priority under 35 U.S.C. §119 to SE Patent Application No. 1350795-9, filed on Jun. 28, 2013, which the entirety thereof is incorporated herein by reference.

TECHNICAL FIELD

In a first aspect, a tool intended for chip removing machining in grooving or parting and of the type includes a blade and a replaceable cutting insert, which is mounted in a seat located in an end of the blade and delimited between a bottom support and an elastically resilient clamping finger. The cutting insert has a front side, a back side, two side surfaces, an under side, and an upper side, in which there is included a rake surface situated closest to the front side, as well as an application surface, positioned behind the same and against which the clamping finger is pressed. The clamping finger includes a flushing channel, which opens toward the rake surface of the cutting insert in order to spray cooling medium against the rake surface and a main cutting edge, which is formed between the rake surface and the front side of the cutting insert.

BACKGROUND

Tools of the type generally mentioned above are used for chip removing or cutting machining of work pieces of metal or the like materials, e.g. composites. A usual machining method is turning, in the form of grooving or parting operations, during which the cutting insert is fed in radially into a rotating work piece to form a circumferential groove in the same. In grooving, the cutting insert is inserted to a moderate depth in the work piece, while parting requires that the cutting insert is inserted to the vicinity of the center axis of the work piece. Tools of the kind in question may also be mounted in rotatable milling cutters having the purpose of providing straight slots in, for instance, a flat surface of a work piece. In both cases, however, it is required that the blade serving as a holder for the cutting insert has a thickness that is less than the width of the front, active main cutting edge of the cutting insert, which determines the width of the groove, because otherwise the blade would not clear from the generated, flat surfaces that delimit the groove. As a consequence of their practical application, the tools are commonly denominated "parting tools".

In this connection, it should be mentioned that the replaceable cutting insert is usually manufactured from cemented carbide or another hard material having large resistance to wear, while the holding blade is manufactured from steel of a suitable quality. The last-mentioned material has—contrary to the hard material of the cutting insert—a certain inherent elasticity, which can be utilized to clamp the cutting insert in the seat of the blade.

Since large amounts of heat are generated during the machining, usually an efficient cooling of the cutting insert and its immediate environment is required. Therefore, traditionally, the cutting insert is cooled from above (overcooling) as well as from below (undercooling).

A tool of the type initially mentioned is disclosed by JP 7-227702. In one of several alternative embodiments, the cutting insert is cooled by overcooling as well as undercooling. In order to provide for overcooling, a flushing channel is arranged in the clamping finger that has the purpose of fixing the cutting insert in the appurtenant seat. The cutting insert includes a front rake surface, as well as a rear application surface, against which the clamping finger abuts. At the front nose of the clamping finger, the cutting insert is formed with a shoulder having the shape of a countersunk surface, which is located immediately behind the rear boundary line of the rake surface and extends essentially vertically downward toward a front boundary line for the application surface. The clamping finger is delimited between an upper side and an under side, which converge toward the nose. The upper side of the clamping finger and the rake surface of the cutting insert are slightly concave (as viewed from the side), so that they together—in the mounted state of the cutting insert—form a concave sink along which the removed, but not yet released, chip can slide until the same has cooled and been formed into a solitary fragment.

A disadvantage of the tool known by JP 7-227702 is that the mouth of the flushing channel is spaced apart from the nose of the clamping finger at the same time the chip does not meet any chip-forming obstacle at all on its way along the upper side of the clamping finger. This means that the cooling medium jet immediately impinges on the chip (and per se cools the same) without efficiently reaching up to the rake surface of the cutting insert. This means that the rake surface and the front main cutting edge get an inferior overcooling.

SUMMARY

In a first aspect, there is provided a tool, the cutting insert and clamping finger of which are formed in such a way that the cooling medium jet, e.g. water jet, which under pressure is sprayed out of the flushing channel, gets in under the chip in order to cool the rake surface in an effective way, as well as to contribute to break out the chip from the cutting insert. A simultaneous object is to utilize the shoulder that has the purpose of protecting the nose of the clamping finger to form chips, so which are distanced from the clamping finger rather than hammering against the same. In other words, the object is to provide improved overcooling and improved chip control.

Accordingly, at least the object is attained by a front nose of the clamping finger facing a shoulder, which is formed between the rake surface and the application surface and has the purpose of protecting the nose from chips. The shoulder of the cutting insert has two knobs mutually separated by a central notch via which cooling medium can pass from the flushing channel toward the rake surface and main cutting edge of the cutting insert. In such a way, front surfaces of the knobs may guide out the chip from the cutting insert, at the same time as the knobs protect the nose of the clamping finger being behind. Thereby, the cooling medium jet can pass freely through the notch and in under the chip to reach in the farthest possible way in the direction of the main cutting edge of the cutting insert.

In one embodiment, the knobs form the highest point of the cutting insert in the mounted state. In such a way, the nose of the clamping finger is lying well protected behind the knobs at the same time as these guide the chip at a safe distance from the clamping finger.

In a further embodiment, the application surface leans obliquely downward and backward from the highest point of the cutting insert formed by the knobs. This also contributes to protecting the nose of the clamping finger behind the knobs at the same time as the same guide the chip at a safe distance from the clamping finger. This also contributes to conditions for a favourable and relatively small angle of the flushing channel through the clamping finger in relation to the rake surface, whereby the liquid jet may be directed fairly exactly toward the main cutting edge of the cutting insert when it passes through the notch.

In another embodiment, the rake surface has a concave bottom, which is surrounded by two lateral ribs running from the main cutting edge to the knobs. Thereby, the chip can partly ride on the lateral ribs toward the knobs, where the same finally leave the cutting insert. During this removal operation, liquid is sprayed under high pressure out through the mouth of the flushing channel, wherein the liquid can pass through the notch between the knobs, penetrate under the chip and find its way toward the main cutting edge.

In a further embodiment, an upper side and an under side of the clamping finger converge toward an end surface of the nose, the flushing channel opening in the upper side as well as in the end surface. In such a way, the mouth of the flushing channel will be at a location low in the clamping finger in order to direct the liquid jet fairly exactly toward the main edge of the cutting insert when it passes through the notch.

In a further embodiment, the rake surface, represented by a deepest-lying, flat bottom, and application surface, represented by two flank surfaces of a V-shaped chute, of the cutting insert are mutually inclined at an obtuse angle that amounts to at most 165°. In such a way, the rake surface of the cutting insert can be oriented essentially horizontally in relation to the length extension of the blade, while the application surface leans obliquely downward/rearward and the two knobs being applied in the transition between the rake surface and the application surface. In this position, the knobs form the highest points of the cutting insert in the operative state.

The positive effect of this will be that the nose of the clamping finger is lying well protected behind the knobs at the same time as these guide the chip at a safe distance from the clamping finger.

In a further embodiment, the cutting insert is single-edged and has a back side in the form of a flat surface, which is pressed against a rear or inner stop face included in the seat and forms an acute angle with the bottom support of the seat, as represented by a pair of flank surfaces of a cross-sectionally V-shaped ridge. The back side of the cutting insert forms an acute angle with the underside of the cutting insert, as this is represented by two flank surfaces in a cross-sectionally V-shaped chute. In such a way, a rigid clamping of the cutting insert in the seat is attained by simple means.

In the last-mentioned embodiment, the acute angle between the back and under sides of the cutting insert may be a supplementary angle to the obtuse angle between the chip and application surfaces of the cutting insert. In this way, the essentially horizontal orientation of the rake surface in relation to the blade is attained in a simple way.

In a second aspect, the invention also relates to a replaceable cutting insert as such.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE APPENDED DRAWINGS

FIG. 11 is an enlarged top view showing an empty seat more in detail.

FIG. 12 is a bottom view of the seat of FIG. 11.

DETAILED DESCRIPTION

Figure 1:
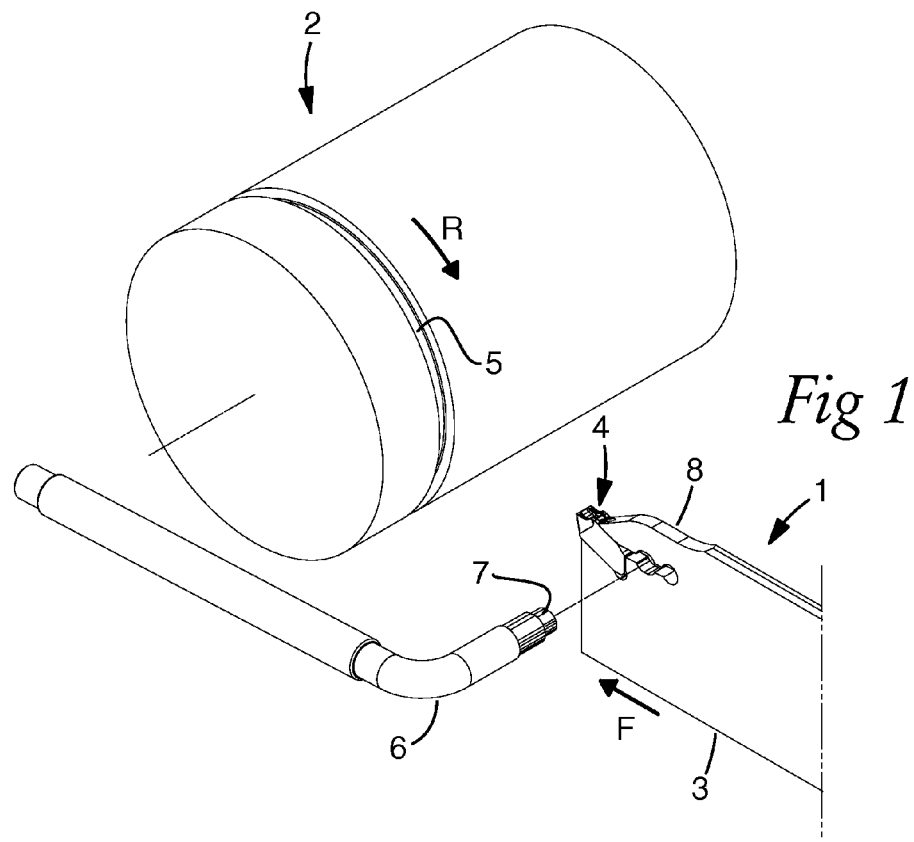
FIG. 1 is a perspective exploded view showing a tool formed in accordance with the disclosure in connection with the turning of a groove in a rotating work piece.

In FIG. 1, a tool 1 is shown in connection with the machining of a work piece 2. The tool is in the form of a turning tool, the main component of which is a blade 3, which serves as a holder or basic body for a replaceable cutting insert 4. The work piece 2 is cylindrical and rotatable in the direction of rotation R. By longitudinally feeding the tool 1 in the feeding direction F during simultaneous rotation of the work piece, in the envelope surface of the same, a circumferential no groove 5 can be provided. The width of the groove is determined by the width of a main cutting edge included in the cutting insert 4, while its depth is determined by how far the blade and its cutting insert are fed into the work piece.

The machining method illustrated in FIG. 1 is a grooving operation.

In FIG. 1, there is further shown a key 6 having an eccentric body 7, by means of which a clamping finger 8 included in the blade can be deflected to allow mounting of the cutting insert 4.

Figure 2:
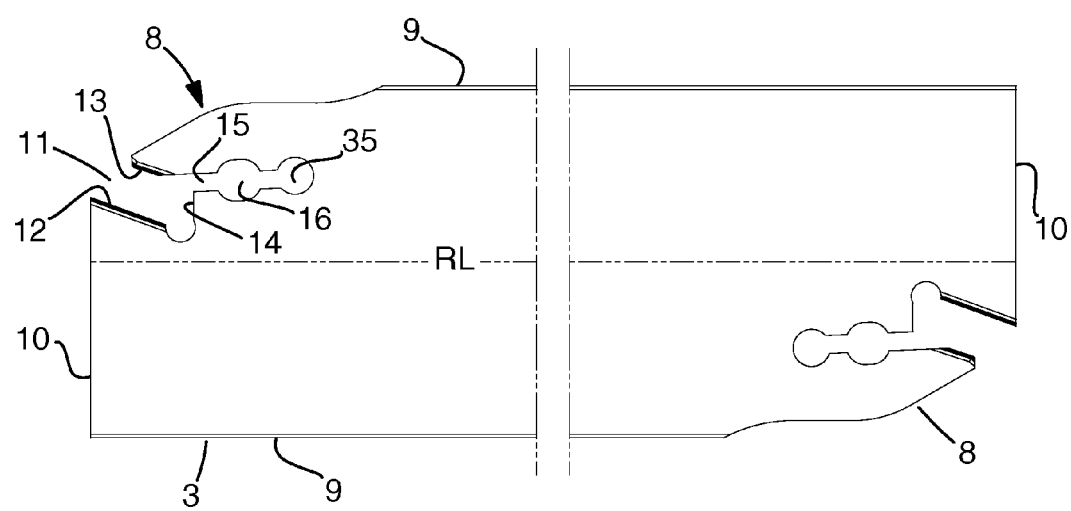
FIG. 2 is an enlarged, sectioned side view of a blade according to the disclosure serving as the insert holder.
Figure 3:
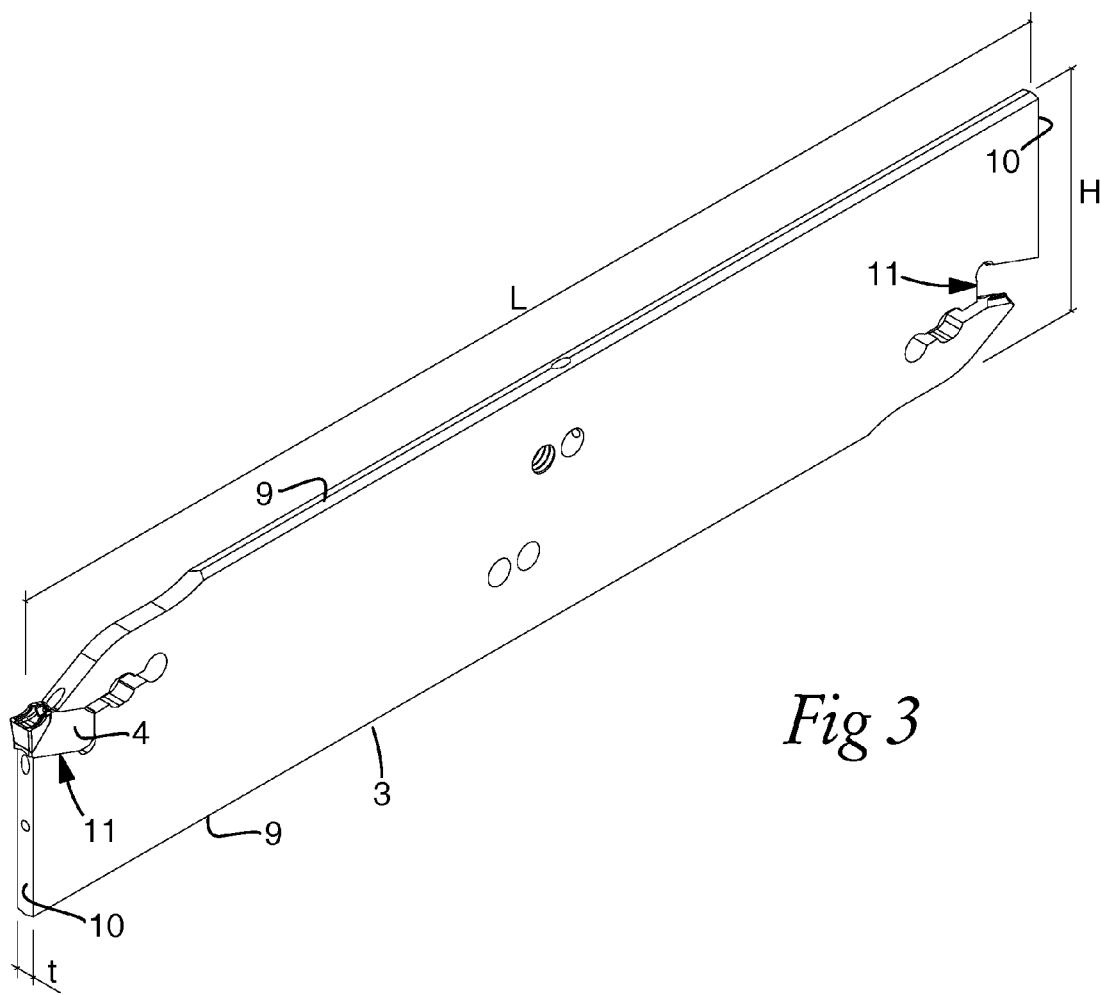
FIG. 3 is a perspective view showing the blade and cutting insert in their entirety.
Figure 4:
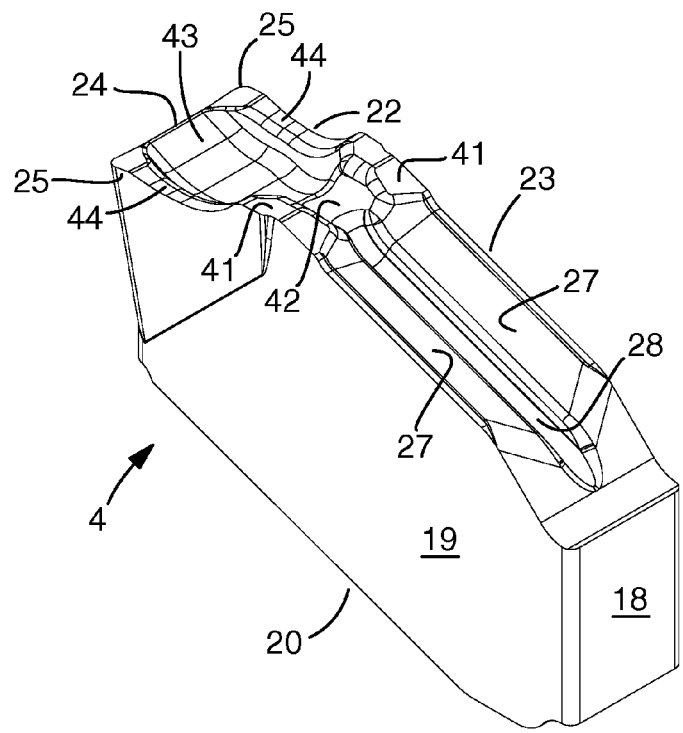
FIG. 4 is a top view showing the cutting insert of the tool.

In FIGS. 2 and 3, the insert-holding blade 3 has an elongate, rectangular basic shape delimited by two longitudinal, parallel side edges 9 and two transverse side edges 10, which form the ends of the blade. In two diagonally opposite corners, seats 11 are formed, in which the cutting insert 4 can be detachably mounted. The reason for the blade in this case to include two seats is that the same should be mountable in a block (not shown), wherein the blade can be reversed so that either one or the other seat assumes the operative state, which is shown in FIG. 1. However, the present discloure is also applicable to such blades that include only one seat.

The individual seat 11 (see FIG. 2) is delimited between a bottom support 12 and an underside 13 of the clamping finger 8. The seat is in addition delimited by an inner stop face 14, which serves as a support to a rear end of the cutting insert and determines the axial position of the cutting insert in the seat. From the seat 11, there extends a slit 15, which mouths in a keyhole 16, into which the eccentric body 7 of the key 6 can be inserted in order to deflect the clamping finger 8 while expanding the seat, more precisely with the purpose of allowing replacement of cutting inserts.

In order to facilitate the following description of the tool, in FIG. 2, a reference line RL is shown, which is parallel to the longitudinal side edges 9 and situated halfway between the same. In this connection, it should be pointed out that the following description is based on the assumption that the blade assumes the horizontal position shown in FIG. 2, and that the operative cutting insert is applied in the left seat (see also FIG. 3).

Figure 5:
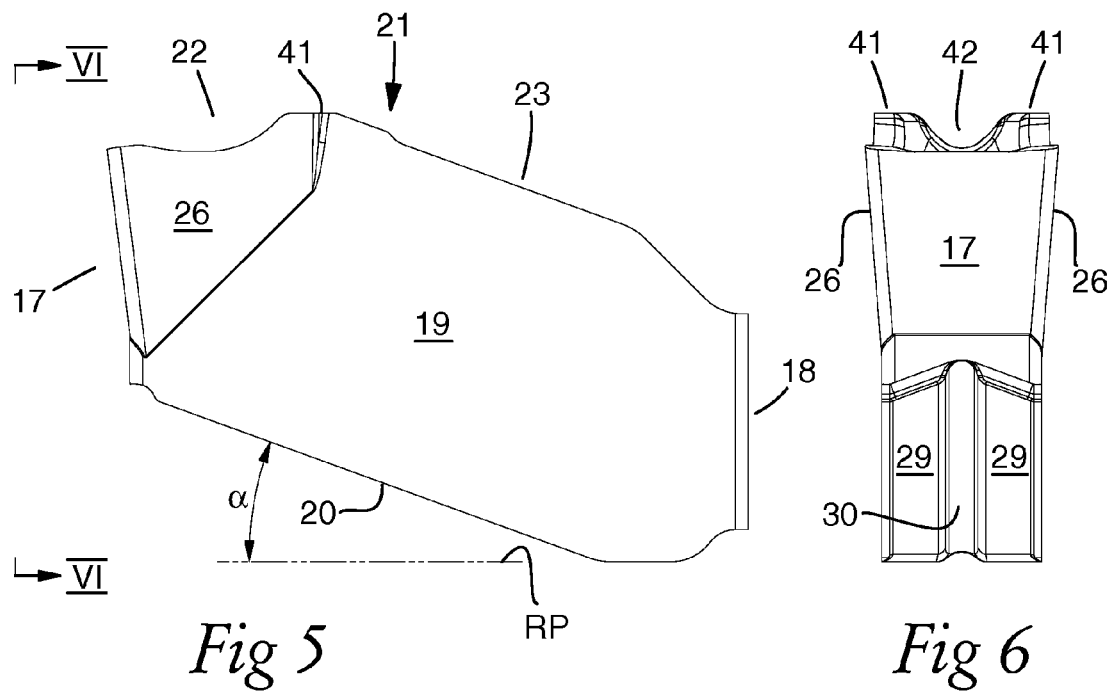
FIG. 5 is a side view of the same cutting insert.

In order to describe the shape of the cutting insert, reference is made to FIGS. 4-10, from which it is seen that the cutting insert generally has the shape of a hexahedron, which is delimited by a front side 17, a back side 18, two identical side surfaces 19, an underside 20, and an upper side in its entirety designated 21. In FIG. 5, it is shown how the underside 20 leans at an angle $\alpha$ to the horizontal plane (according to FIG. 2), more precisely at the same angle as the bottom support 12 of the seat 11 leans in relation to the reference line RL. In the example, a amounts to 20°. However, this value may vary, although a should not be less than 10° or be more than 45°.

In the upper side 21, two different part surfaces are included having different functions, viz. on one hand a rake surface 22, and on the other hand an application surface 23, against which the clamping finger 8 is pressable. Between the rake surface 22 and a flat surface, which forms the front side 17, a main cutting edge 24 is formed, to which two short, secondary cutting edges 25 (see FIG. 4) connect having the purpose of smoothening the flat surfaces generated by the main cutting edge 24. The front side 17 forms a clearance surface, which does not have contact with the work piece. Two opposite side surfaces 26 form, in an analogous way, clearance surfaces for the secondary cutting edges 25.

The application surface 23 has the shape of a cross-sectionally V-shaped chute, which opens upward and includes two flank surfaces 27, which are separated by a central slot 28.

Figure 6:
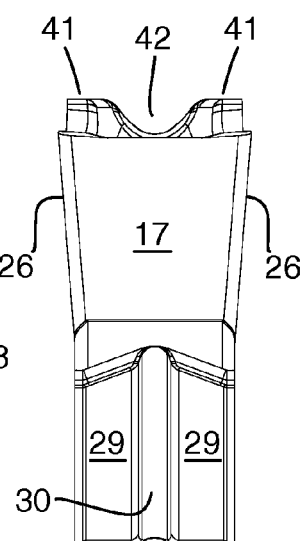
FIG. 6 is a front view taken along VI-VI in FIG. 5.
Figure 7:
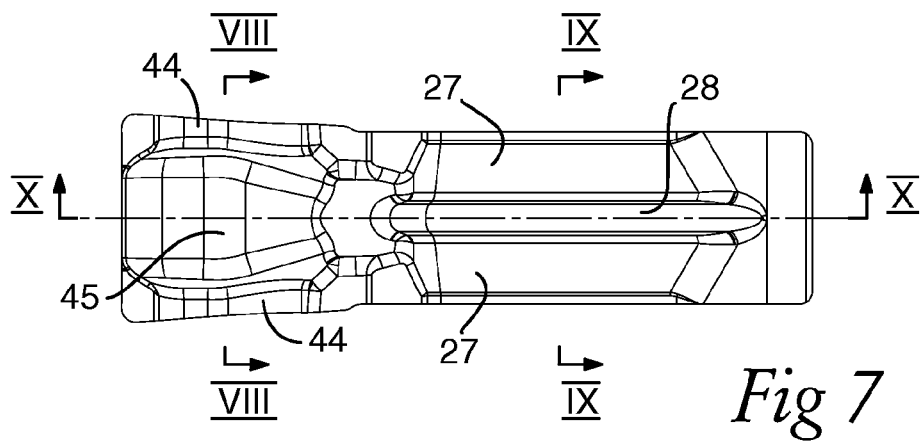
FIG. 7 is a planar view from above of the cutting insert.
Figure 8:
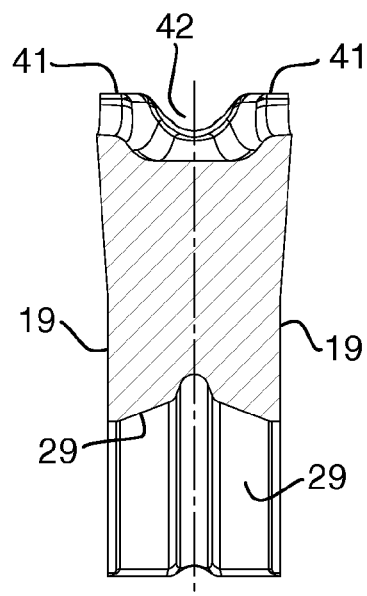
FIG. 8 is a cross-section taken along VIII-VIII in FIG. 7.
Figure 9:
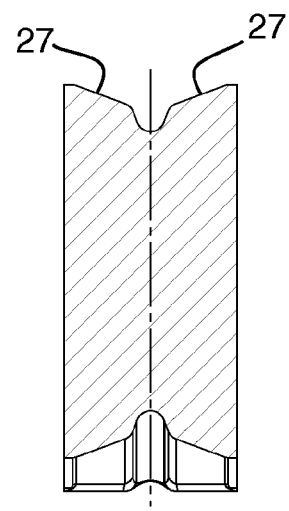
FIG. 9 is a cross-section taken along IX-IX in FIG. 7.

Also the underside 20 has the shape of a cross-sectionally V-shaped, downwardly opening chute, in which two flank surfaces 29 are included and separated by a central slot 30 (see FIGS. 6 and 8).

Reference is now made to FIGS. 11 and 12, from which it is seen that the bottom support 12 of the seat 11 as well as the underside 13 of the clamping finger 8 have the shape of cross-sectionally V-shaped ridges for the interaction with the V-shaped chutes in the cutting insert. Thus, the bottom support 12 includes two flank surfaces 31, which converge toward a common ridge 32. In an analogous way, two flank surfaces 33 converge toward a common ridge 34. These together form the underside of the clamping finger generally designated 13. The ridges 32, 34 have the purpose of guiding the cutting insert into correct position in the seat, more precisely by being inserted into the slots 28, 30 without having direct contact with the same when the cutting insert is in clamped position.

In this context, it should be mentioned that the keyhole, which in its entirety is designated 16 in FIG. 2, includes an upper recess in the underside of the clamping finger 8, and a lower recess, which is situated behind the stop face 14 and opens upward. It should also be mentioned that the clamping finger 8 is separated from the rest of the blade via a circular hole 35 (see FIG. 12), which protects the blade against fatigue of the specific zone where an elastic deflection of the clamping finger should occur.

In addition to two opposite, plane-parallel side surfaces 36, the clamping finger 8 is delimited by an upper side 37 and an underside 13 (the flank surfaces 33), the upper sides and the undersides converging toward a nose in its entirety designated 38, in which a flat end surface 39 is included. The last-mentioned surface transforms into the likewise flat upper side 37 via a boundary line designated 40.

Figure 10:
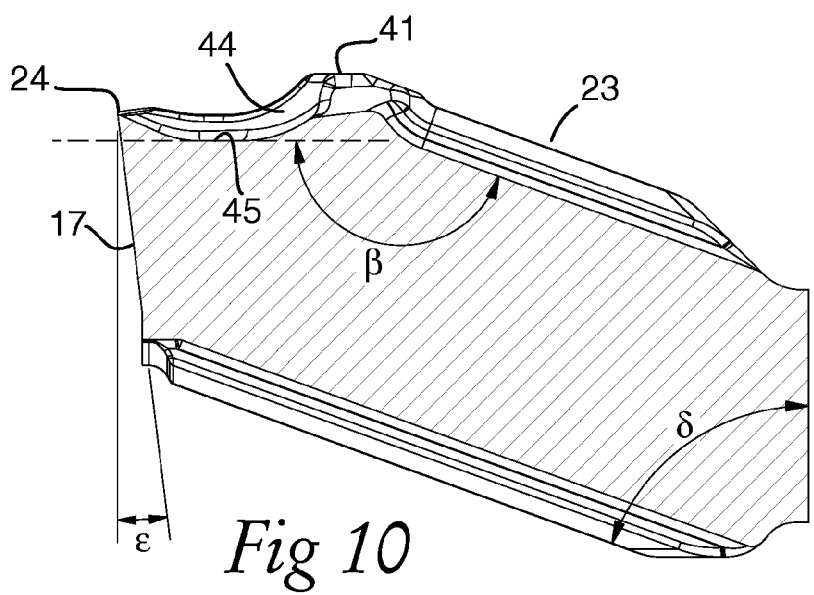
FIG. 10 is a longitudinal cross-section taken along X-X in FIG. 7.

Referring again to FIGS. 4-10, two knobs or projections 41 are formed between the rake surface 22 and the application surface 23. These knobs are located near the two side surfaces 19 of the cutting insert and separated by a central notch or depression 42. In the mounted, functional state of the cutting insert, the knobs together form a shoulder, behind which the nose of the clamping finger is located in a position protected from chips. As seen in FIG. 5, the knobs form the highest points of the cutting insert, from which the application surface 23 leans backward (approximately at the angle $\alpha$). The rake surface 22 has a shape, which is characterized in that a concave bottom 43 (see FIG. 4) is surrounded by two lateral ribs 44 running from the main cutting edge 24 to the knobs 41. As seen in FIG. 10, the thickness of the ribs 44 increases in the direction from the main cutting edge toward the knobs 41, the upper side of the individual rib being a concave surface and the highest point of which connects to the individual knob. In the bottom 43, countersunk in relation to the ribs, a plurality of part surfaces are included, the one designated 45 of which is a flat surface essentially parallel to the reference plane RP shown in FIG. 5, which in turn is parallel to the reference line RL (see FIG. 2) when the cutting insert is mounted in the seat. If the flat bottom surface 45 is taken as a basis for the orientation of the rake surface in relation to the orientation of the application surface 23, the two surfaces form an obtuse angle $\beta$ with each other, as seen in FIG. 10. In the example, when $\alpha$ amounts to 20°, $\beta$ amounts to 160°. It should also be noted that the angle $\delta$ amounts to 20°. However, the angle (not shown) between the rake surface and the clearance surface 17 is less than 20°, more precisely with the purpose of providing a clearance angle $\epsilon$.

As is clearly seen in FIG. 5, as well as FIG. 10, the shoulder formed by the knobs 41 forms the highest point of the cutting insert, from which the application surface leans obliquely downward/rearward, while the rake surface 22 (with the surface 45 as reference plane) extends approximately horizontally forward from the knobs.

Figure 13:
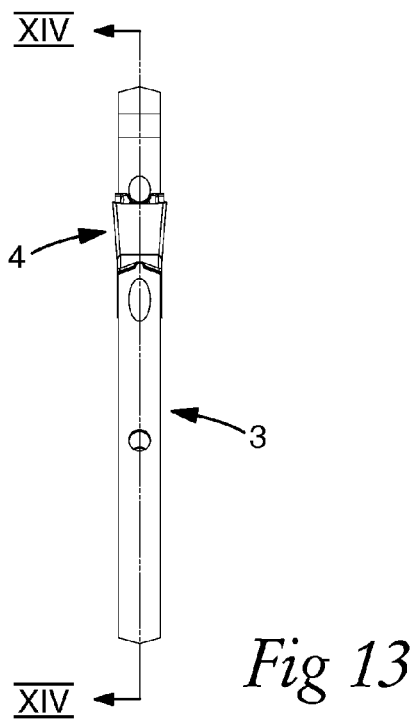
FIG. 13 is an end view of the blade with the mounted cutting insert.
Figure 14:
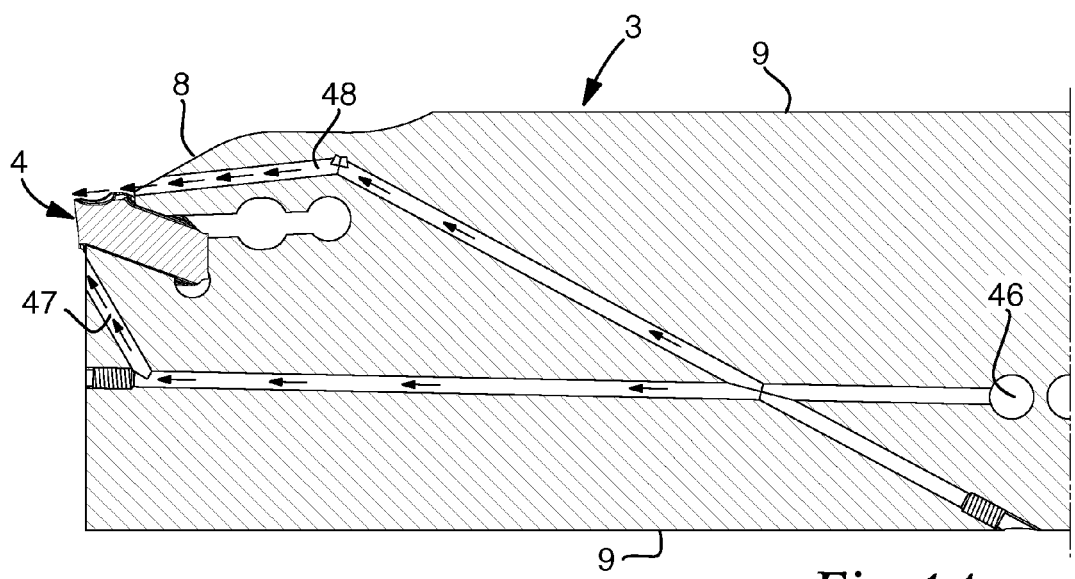
FIG. 14 is a central longitudinal cross-section taken along XIV-XIV in FIG. 13. showing a channel system in one half of the blade.

Reference is now made to FIGS. 13 and 14, which illustrate how the blade 3 includes a system of drilled and plugged channels, via which a cooling medium, in particular liquid, can be conveyed toward the cutting insert 4. Thus, from a central side inlet 46, liquid may be fed via a channel 47 for the cooling of the cutting insert from below. A channel 48 for the overcooling of the cutting insert is partly routed through the clamping finger 8. As seen in FIGS. 11 and 12, the channel 48 mouths in the area of the nose 38 of the clamping finger. More precisely, the channel 48 opens, on one hand, in the upper side 37 of the clamping finger, and, on the other hand, in the flat end surface 39 of the nose 38. This location of the mouth of the overcooling channel 48 means that the liquid jet that is sprayed out of the channel will be situated comparatively low, and in spite of this low location be able to pass through the notch 42 between the knobs 41. This is illustrated in FIG. 15.

Figure 15:
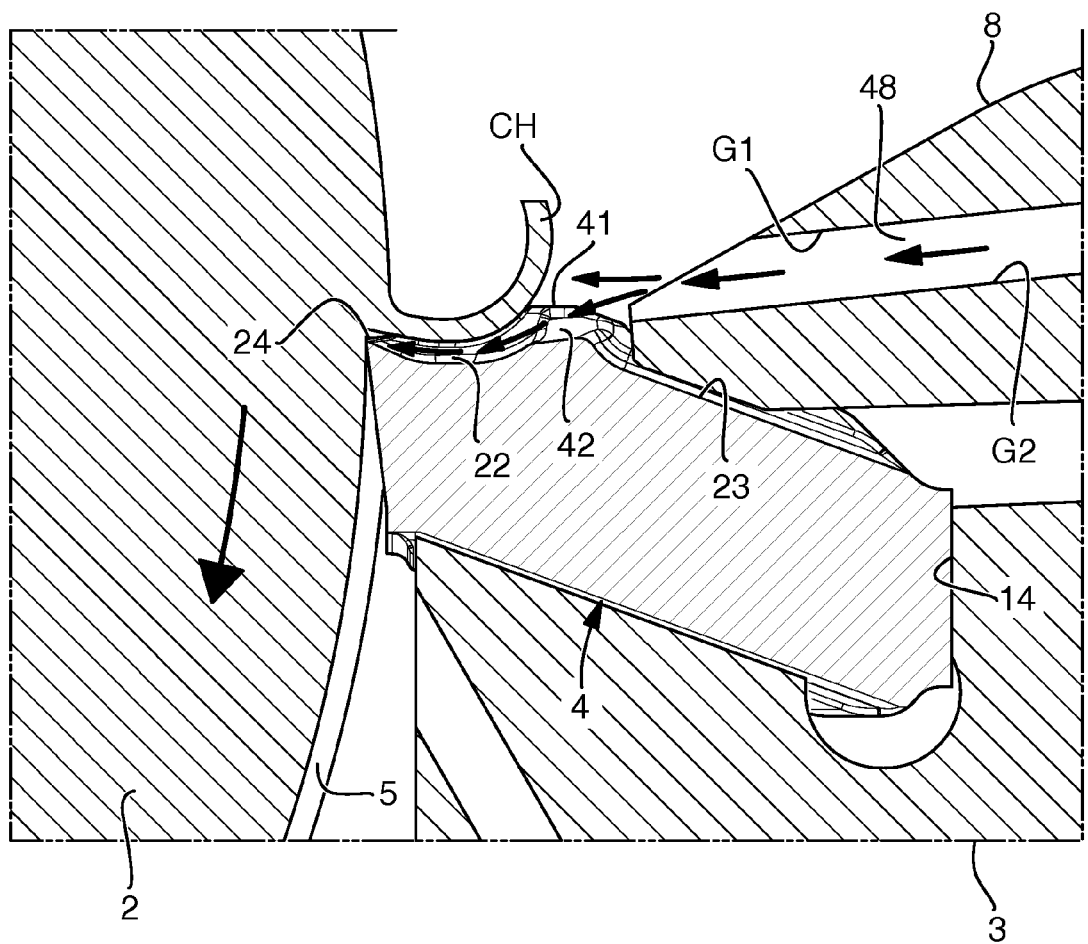
FIG. 15 is an enlarged detailed cross-section showing the tool in operation, i.e., during chip removal and simultaneous cooling.

In FIG. 15, G1, G2 designate upper and lower generatrices of the cross-sectionally circular channel 48, which are obtained by drilling in the material of the blade. During turning in the work piece 2, the cutting insert 4 removes a chip designated CH while generating the aforementioned groove 5. More precisely, the chip removal is primarily effected along the main cutting edge (the so-called weld zone), whereupon the chip successively cools down and is curved in the way outlined in FIG. 15. In this connection, the chip will partly ride on the aforementioned ribs 44 toward the knobs 41, where the same finally leave the cutting insert. During the removal operation, liquid is sprayed under high pressure out through the mouth of the channel 48, wherein the liquid can pass through the notch 42 between the knobs 41. In this way, the liquid can penetrate under the chip and find its way toward the main cutting edge (however, the liquid is evaporated before it de facto would be able to reach up to the main cutting edge). In FIG. 15, it is seen that an imaginary extension of the lower generatrix G2 is directed toward the main cutting edge 24, at the same time as the same is located near the bottom of the notch 42, i.e., at a considerable depth below the upper sides of the knobs 41. This does not only provide the advantage in that the cooling liquid reaches far forward in the direction of the main cutting edge, but also that the same contributes to breaking the chip in the way outlined in FIG. 15. Naturally this chip breaking effect increases with increasing pressure of the cooling liquid. In practice, the pressure used may amount to 50 to 100 bar or more. Such pressures apply forces to the chip, which are sufficiently large to considerably contribute to the removal of the chip from the cutting insert.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A tool for chip removing machining, comprising:
   a blade; and
   a replaceable cutting insert for grooving or parting mounted in a seat located in an end of the blade and delimited between a bottom support and an elastically resilient clamping finger, the cutting insert including a front side, a back side, two side surfaces, an under side, and an upper side, a rake surface is included in the upper side and situated closest to the front side and an application surface is positioned behind the same and against which the clamping finger is pressed, the clamping finger includes a flushing channel ,which opens toward the cutting insert, in order to spray a cooling medium toward the rake surface and a main cutting edge formed between the rake surface and the front side of the cutting insert , wherein a front nose of the clamping finger faces a shoulder formed between the rake surface and the application surface for protecting the nose from chips, the shoulder of the cutting insert including two knobs mutually separated by a central notch via which cooling medium can pass from the flushing channel toward the rake surface and the main cutting edge, wherein the knobs form a highest point of the cutting insert in a mounted state.

2. A tool according to claim 1, wherein the application surface leans obliquely downward and backward from the highest point of the cutting insert formed by the knobs.

3. A tool according to claim 1, wherein the rake surface has a concave bottom surrounded by two lateral ribs running from the main cutting edge to the knobs.

4. A tool according to claim 1, wherein an upper side and an underside of the clamping finger converge toward an end surface of the nose, the flushing channel opening in the upper side as well as in said end surface.

5. A tool according to claim 1, wherein the rake surface of the cutting insert has a deepest-lying, flat bottom, and the application surface formed by two flank surfaces in a V-shaped chute, the flat bottom of the rake surface and the application surface are mutually inclined at an obtuse angle of at most 165°, the knobs being located in a transition between the rake surface and the application surface.

6. A tool according to claim 5, wherein the cutting insert is single-edged and has a back side formed by a flat surface pressed against a rear stop face, included in the seat and forming an acute angle with the bottom support of the seat, the face bottom support being formed by a pair of flank surfaces having a cross-sectionally V-shaped ridge, said back side forming an acute angle with the underside of the cutting insert formed by two flank surfaces in a cross-sectionally V-shaped chute.

7. A tool according to claim 6, wherein the acute angle formed between the back side and the underside of the cutting insert is a supplementary angle to the obtuse angle formed between the rake and application surfaces of the cutting insert.

8. A cutting insert for a tool for chip removing machining in grooving or parting, comprising;
   a front side;
   a back side;
   two side surfaces;
   an under side; and
   an upper side including a rake surface situated closest to the front side, and an application surface positioned behind the same, for a clamping finger of a blade of the tool, wherein a shoulder, which separates the rake surface from the application surface, is formed to protect a front nose of the clamping finger from chips, the shoulder includes two knobs mutually separated by a central notch for the passage of cooling medium toward the rake surface and a main cutting edge formed between the rake surface and the front side, wherein the knobs form a highest point of the cutting insert in a mounted state.

9. A cutting insert according to claim 8, wherein the application surface leans obliquely downward and backward from the highest point of the cutting insert formed by the knobs.

10. A cutting insert according to claim 8, wherein the rake surface has a concave bottom surrounded by two lateral ribs running from the main cutting edge to the knobs.

11. A cutting insert according to claim 10, wherein the upper side of the individual lateral rib is a concave surface, the highest point of which connects to the individual knob.

12. A cutting insert according to claim 8, wherein the rake surface has a deepest-lying, flat bottom, and the application surface formed by two flank surfaces in a V-shaped chute, the flat bottom of the rake surface and application surface being mutually inclined at an obtuse angle of at most 165°.

13. A cutting insert according to claim 12, wherein the same is single-edged and has a back side forming an acute angle with the underside formed by two flank surfaces in a cross-sectionally V-shaped chute.

14. A cutting insert according to claim 13, wherein the acute angle between said back side and underside is a supplementary angle to the obtuse angle between the rake and application surfaces.

* * * * *